Patented Mar. 1, 1949

2,463,072

UNITED STATES PATENT OFFICE 2,463,072

MANUFACTURE OF CATALYSTS

Glenn M. Webb and Marvin A. Smith, Riverside, Ill., assignors to Universal Oil Products Company, Chicago, Ill., a corporation of Delaware No Drawing. Application September 27, 1944, Serial No. 556,092

6 Claims. (Cl. 252—465)

The present invention is concerned with the manufacture of catalysts useful in various processes involving the treatment or conversion of organic compounds and particularly hydrocarbons. It is more particularly concerned with improved methods for manufacturing catalysts having superior activity in these types of processes. This application is a continuation-in-part of our earlier application Serial No. 436,506, filed March 27, 1942, now Patent No. 2,371,087, March 6, 1945.

Broadly the present invention comprises the preparation of associations of alumina and other catalytic substances by forming a hydrated alumina from an aluminum salt having the aluminum in the cation, combining said alumina with an aqueous solution of a compound constituting the source of the other catalytically active compound in the final composite, said compound being characterized in that the metal is present in the anion radical and that the cation group is volatilizable, evaporating the mixture to dryness and heating the resultant composite to develop its catalytic properties.

The process of the invention is particularly applicable to the production of catalysts in which alumina is a major constituent and oxides such as molybdic oxide are minor constituents. Such catalysts are particularly useful in various hydrocarbon conversion reactions including reforming petroleum fractions with or without added hydrogen. Alumina-molybdena catalysts are particularly useful in the so-called "hydroforming" process in which hydrocarbon fractions such as naphthas together with hydrogen are treated in the presence of the catalysts to increase the antiknock value, preferably without substantial consumption of hydrogen.

The alumina hydrogel may be combined with the other catalytical compounds by various methods. We have discovered that superior catalysts can be produced by the following methods of preparation.

METHOD I

The composites comprising associations of alumina and other catalytically active substances, particularly oxides, are prepared by partially or completely precipitating hydrated aluminum oxide by means of a volatilizable basic precipitant from a solution of an aluminum salt, thereby forming from the acid radical of said aluminum salt, and said precipitant, a salt which is readily volatilizable or decomposable without residue, said precipitation being effected in the presence of a compound yielding the said other catalytically active substance and containing a metal in its anion radical, thereafter evaporating the solution to substantial dryness, and further heating the residual material thus obtained to volatilize the salt of the precipitant to produce the catalytic composite.

METHOD II

The catalyst composite is prepared by adding a volatile basic precipitant to a solution of an aluminum salt and a compound capable of yielding the other catalytically active substance to form a precipitate of hydrated alumina by which at least a portion of said catalytically active compound is sorbed, washing said precipitate to remove at least a portion of soluble compounds other than said compound capable of yielding the catalytically active substance, and thereafter heating to produce a catalytic composite.

METHOD III

The catalyst composite is prepared by adding a volatile basic precipitant to a solution of an aluminum salt under conditions of temperature, concentration of reactants and rate of addition which will form a gelatinous precipitate of hydrated alumina separating and washing said alumina under closely controlled conditions of pH, without otherwise substantially drying it, to the substantially complete removal of soluble salts therefrom, suspending the washed alumina in water, adding a compound capable of yielding the other catalytically active substance to the suspension, heating the suspension to evaporate water and calcining to develop the desired catalyst.

As a specific modification of Method III, the precipitated hydrated alumina may be filtered from the solution containing it and incorporated into the solution of other catalytically active substance without the intermediate washing operation. The volatilizable salt formed by combining the cation of the basic precipitant and anion of the aluminum salt will be removed during the subsequent calcination step.

The foregoing briefly described procedure has been found to produce catalytic associations of alumina and other catalytic oxide substances which associations have superior catalytic activity in various organic reactions when compared with catalyst composites of similar chemical composition prepared by previously established methods of manufacture. Such methods as, for example, the impregnation of prepared granular aluminas such as the "activated aluminas" of commerce with solution of compounds yielding catalytically active oxides after evaporation of solvent followed by chemical or thermal decomposition of the added compound to form the final composite, are well known and widely used manufacturing methods to which the present method is decidedly superior.

The catalysts produced by the present process have been found to be superior in catalytic activity both as regards initial activity and the ability of the catalysts to maintain their activity over periods of sustained use, with or without regeneration, in comparison with composites of similar chemical composition prepared by the so-called co-precipitation processes. The co-precipitation methods include those in which the essential ingredients of the composite are formed either by interaction with one another or by the addition of precipitants to solutions containing both a compound of aluminum and a compound capable of yielding the desired catalytically active oxide. In such processes, the association is made by simultaneous precipitation of the components, usually followed by washing and heating the composite.

The present process has also been found to yield generally better catalysts than those produced by either the successive precipitation of alumina and the other catalytically active oxides or those prepared by suspending granular alumina in solutions of such compounds and then causing precipitation of the catalytically active material.

Many advantages of this process are derived from the simple procedural steps involved. One general advantage lies in the fact that there is an even distribution of the non-aluminiferous compound throughout the body of the alumina so that the catalytic surfaces are much more uniform than is the case when employing other more conventional types of processes. Thus, for example, for a given degree of activity, it is found that the present catalysts tend to produce less carbon for a given conversion than is the case with catalysts of similar chemical composition made, for instance, by impregnation of alumina. This is thought to be due to the fact that the catalytic surfaces are more uniform and that there are no relatively large clusters or concentrations of the non-aluminiferous component at various points through the alumina particles as may be the case with other alumina containing composites prepared either by co-precipitation or by impregnation methods. As a result, the overall activity is improved and the catalyst becomes more selective for the reaction it is to catalyze.

Another advantage of this method is found in those composites falling within the scope of this invention wherein the added non-aluminiferous compound has an appreciable vapor pressure at the processing or reactivating temperature at which the catalyst is used. Thus, for example, molybdena or chromia have appreciable vapor pressures at temperatures above 700° C. which temperature is often reached during the course of either processing or regeneration, and the catalyst loses appreciable quantities of the substances associated with the alumina, or else there may be a substantial migration of the substances to other parts of the catalyst particles with resultant diminution of catalytic efficiency with prolonged use.

Because of the manner in which the alumina and the added substance are composited and because of the extremely intimate association of the catalyst components after the composite is made, the tendency for the substance to vaporize or to migrate appears to be substantially reduced and as a result thereof, a great improvement in the high degree of catalytic activity is realized throughout prolonged use.

In accordance with the present process, the hydrated aluminum oxide is precipitated from a solution of an aluminum salt; that is, the aluminum is contained in the cation of the aluminum salts. Such salts may include salts of hydrochloric acid, hydrobromic acid, hydrofluoric acid, sulphuric acid, carbonic acid, nitric acid, acetic acid, oxalic acid, and other acids which yield soluble aluminum salts. Aqueous solutions of aluminum salts are generally preferable. It is comprised within the scope of the invention to employ solutions of aluminum salts in other types of solvents which are substantially inert or non-reactive with aluminum salts or other ingredients to be used in the preparation of the catalyst composites as described hereinafter. By inert or non-reactive, it is meant that the solvent shall not cause transformation of the ingredients into an undesirable form, or which may bring about an undesirable precipitation of the non-alumina ingredient. Mixtures of aqueous and non-aqueous solvents may be used in certain instances where the non-alumina substance is not sufficiently soluble in water.

The volatilizable basic precipitants used in the present process include generally ammonium compounds having a basic reaction such as, for example, ammonium hydroxide, ammonium carbonate, etc. Also useful in accordance with the present invention are substituted ammonium compounds such as amines or nitrogen bases generally, insofar as the compounds formed between these substances and the volatilizable acids in association with aluminum are sufficiently volatizable and leave no undesirable residues upon subsequent decomposition or volatilization. It is preferable that the salt formed between the volatilizable basic precipitant and the acid radical be soluble in the solvent employed so that the only material not in solution is the precipitated hydrated alumina containing the sorbed compound.

The catalytically active compounds referred to above comprise compounds of the metals in the left hand columns of groups V and VI of the periodic table and particularly compounds which yield the oxides of chromium, molybdenum and vanadium in the final catalyst composite.

As a feature of this invention, the catalytically active compound to be combined with the alumina and which constitutes the source of the catalytically active compound in the composite catalyst is characterized by the fact that the metal constituents of said compound appears in the anion radical and that the cation group is volatile leaving the oxide of the metal as the residue upon decomposition; for example, by heating or if a three-component catalyst is desired, the cation group is either magnesium or zinc ion which upon decomposition form either magnesium or zinc oxide in the composite catalyst. Specific examples of these compounds are ammonium chromate, ammonium molybdate, ammonium vanadate, chromic acid, molybdic acid, vanadic acid, magnesium chromate, magnesium molybdate, zinc chromate or molybdate and similar compounds.

The aluminum hydrogel prepared from the aluminum salts may be combined with the other catalytically active compounds by various methods to produce superior catalysts of substantially equivalent activity and thermal stability.

In previously mentioned Methods I and II, it is necessary to add a sufficient quantity of the precipitant to bring the pH to a value of at least about 4 to effect precipitation of a major portion of the hydrated alumina. In order to effect substantially complete precipitation of the hydrated alumina, it may be necessary to go to higher pH values even to the point of having the solution decidedly basic. The exact pH chosen in the preparation of any particular catalyst will depend upon the concentration of the aluminum salt solution and upon the characteristics of the other ingredients present at this stage of the catalyst preparation. In certain instances, these non-aluminiferous ingredients may be soluble in either acidic or basic solutions. However, some compounds may be sufficiently soluble only if the system is maintained on the acid side while in other cases, it is necessary to maintain the solution distinctly on the basic side in order to prevent undesirable coprecipitation of the non-aluminiferous ingredients together with the hydrated alumina. Some ingredients may be soluble at substantially the neutral point while others may precipitate at this point but remain soluble in basic or acidic solution. Only such compounds as are soluble in water and/or other solvent in the presence of the volatilizable precipitant and the hydrated alumina should be employed since if precipitation of the compound to be associated, or co-precipitation occurs, the improvements will not be fully realized. This limits the compounds that may be added. In some instances there is a possibility of reaction between the alumina and the other compound. This does not mean that the aluminum salt and the non-aluminiferous salt have co-precipitated, but merely that some physical-chemical interaction such as the adsorption by the hydrated alumina may have taken place. We do not, however, intend to be bound unduly by any such explanation.

In certain cases wherein the added compound is sufficiently soluble only at a pH of less than 7; or where it is desired to carry out the precipitation of alumina hydrate in a slightly acid system it may be that the pH will be inadvertently carried too high. It may be adjusted by adding a small amount of an acid to the system. Alternatively, a small amount of the aluminum salt may be added. This makes the operation somewhat more flexible in that no great harm is done at this stage if optimum conditions are not attained the first time.

In certain cases it may be desirable to precipitate the alumina substantially completely by carrying the pH over to the basic side and thereafter bring the pH back to the acid side by the addition of an appropriate acid, for example, acetic acid or hydrochloric acid. Such a procedure may be followed in accordance with the principles of this invention especially when the compound constituting the source of the non-aluminiferous catalytic substance is soluble in either basic or acidic solution. Thus, for example, one may make a solution of aluminum chloride and ammonium molybdate. A sufficient quantity of ammonium hydroxide may be added to bring the pH to about 8 thereby completely precipitating the alumina as hydrated aluminum oxide. If a comparatively concentrated solution of the aluminum salt is used originally, the hydrated alumina may coagulate and form a more or less rigid gel or particles of gel, which tend to separate upon standing.

To overcome the tendency toward non-uniformity, acetic acid, for example, may be added until the pH is on the acid side and part of the alumina is converted to a hydrosol.

From this point on the procedure of Methods I and II differ considerably. In Method I, the next step of the catalyst manufacture comprises heating the suspension of hydrated aluminum oxide in the solution containing the non-aluminiferous compound (as well as salts of the basic precipitant and the acid radical of the aluminum salt) to drive off water (or other solvent if all is used) and leave a residual relatively dry solid material.

In the next step the residual mass is heated at higher temperatures generally not exceeding 900° C. to remove by volatilization or decomposition the reaction products resulting from the precipitation of aluminum hydrate; to drive off the remaining free water and at least a part of the bound water; and to develop the catalytic properties of the composite. This may involve, in part, decomposition of the non-aluminiferous compound present into the oxide or other substance which is to be present in the final catalyst composite. When ammonium compounds have been used as the precipitants for the hydrated alumina in the primary stage of the process, the materials volatilized will be ammonium salts. For example, if ammonium hydroxide has been added to a solution of aluminum chloride the principal material volatilized in the final heating stage will be ammonium chloride. If volatile organic acids such as acetic acid have been present, or aluminum acetate were used in the preparation, some carbon may be present in the dry, solid mass due to decomposition of the organic material. In such a case it is desirable to carry out the final heating step in the presence of an oxygen-containing gas to burn out the carbon.

Ordinarily, calcination temperatures below approximately 900° C. and sometimes temperatures as low as about 200° C. may be employed in the final heating step. The exact temperature and time of heating used for any given catalyst preparation is dependent to a large extent upon the volatilization temperature of the salt of the basic precipitant; the use to which the catalyst is to be put; and upon other factors such as the decomposition temperature of the non-aluminiferous compound to yield the associated catalytic oxide or substance. In many of these preparations, care must be taken to avoid overheating of the composite. Thus, for example, when preparing catalysts for the dehydrogenation of dehydrogenatable organic compounds, temperatures in excess of about 900° C. should be avoided, and if the heating is carried out at such a temperature, the time of heating should be limited so that substantially no loss in catalytic activity occurs due to overheating. The correlation of time and temperature is always an important consideration in calcining catalysts, particularly when temperatures of the order of 700° C. or higher are used. It is a feature of any of the catalysts produced by the process of the present invention that they withstand higher temperatures for longer times than catalysts of similar composition prepared by hitherto known methods. It is an advantage of the process that there is less likelihood of ruining the catalyst because of inadvertent overheating. In general, heating conditions which result in the transformation of alumina to the alpha alumina form are to be avoided.

The final catalyst composite, after the calcination step, may be comminuted for use in powdered condition or it may be formed into various shapes by compression or extrusion methods. In forming pelleted catalyst from the catalytic material after the volatilization of the salts in the final step of preparation, the solid residue may be ground to a desired size and a small percentage of lubricating materials such as rosin or fatty substances may be added to facilitate pilling in standard type of machines. Usually such pellets are later calcined at sufficiently elevated temperatures to remove the lubricant. As a further variation certain of the dried composites may be formed into shapes after drying, and the calcination step may then be carried out on the preformed particles.

In Method II, following the precipitation of the hydrated alumina which is carried out under such conditions that the hydrated aluminum is in a filterable and washable form, usually gelatinous and the other compound is sorbed at least in part by the hydrated alumina, the precipitate is washed by any suitable method such as by decantation, percolation or slurrying followed by either decantation or filtration until at least a portion of soluble salts is removed, while retaining a portion of the sorbed compound serving as the source of the other catalytically active substance. The salts, which it is desired to remove, are those resulting from the precipitation of the alumina and comprise the anion of the aluminum salt and the cation of the basic precipitant.

The washed material is now heated under controlled temperature conditions to volatilize the volatilizable constituents and to develop the catalytic properties of the composite. In this step the residual mass is heated at higher temperatures generally not exceeding 900° C. to remove by volatilization or decomposition any remaining reaction products resulting from the precipitation of aluminum hydrate; to drive off the remaining free water and at least a part of the bound water; and to develop the catalytic properties of the composite. This may involve, in part, decomposition of the non-aluminiferous compound present into the oxide or other substance which is to be present in the final catalyst composite. When ammonium compounds have been used as the precipitants for the hydrated alumina in the primary stage of the process, the materials volatilized may comprise ammonium salts.

Ordinarily, calcination temperatures below approximately 900° C. are employed in the final heating step. The exact temperature and time of heating used for any given catalyst preparation is dependent to a large extent upon the volatilization temperature of the salt of the basic precipitant when the washed precipitate contains this salt; the use of which the catalyst is to be put; and upon other factors such as the decomposition temperature of the non-aluminiferous compound to yield the associated catalytic oxide or substance. In general, heating conditions which result in the transformation of alumina to the alpha form are to be avoided.

In Method III of the present invention, the first step involves the precipitation of a hydrated alumina from a solution of an aluminum salt using volatile basic precipitants similar to those employed in Methods I and II. The conditions under which precipitation is brought about are preferably controlled so that a gelatinous, filterable precipitate of hydrated alumina is formed. The concentration of the aluminum salt may vary over a considerable range but is usually within the range of 1 gram molecular equivalent of aluminum chloride hexahydrate in from about 1 to 5 liters of water. Concentrated solutions of precipitant such as ammonium compounds, may be used in the precipitation which may be conducted at temperatures of from about 0 to about 90° C., and precipitation is preferably conducted during vigorous stirring so that the precipitate is obtained in a relatively finely divided condition. The precipitant is added until a pH value of from about 5 to about 8.5 is produced and at this time the precipitate is separated and washed to remove a substantial portion of soluble salts. Alternatively, with the precipitation of the hydrated alumina as a finely divided gelatinous hydrated material, a sol may be produced which is allowed to gel and the gel broken up for the washing step.

In the next step the precipitated wet hydrated alumina is filtered and washed by any suitable method such as by decantation, percolation or alternate slurrying and filtering. Washing is preferably conducted with water having a pH close to 7 to prevent increase in size of the alumina particles which may occur if water having a pH higher than this is employed. If pH values lower than 7 are employed, there will be a tendency of re-solution of the alumina. Washing may be conducted until substantially all of the ammonium salts are removed, although if minor amounts are left, they will be volatilized or decomposed into volatile products, in subsequent heating and calcining steps hereinafter described.

The washed and purified alumina may now be suspended in water to form a slurry and a compound is dissolved in the suspending medium which is capable of yielding the desired catalytically active material. After a thorough mixing to insure intimate contacting of the alumina particles and the solution of the dissolved compound, the total mixture is heated to evaporate the water. Temperatures which can be employed in the final drying may range from about 250 to about 500° F. After the volatile content of the residue from the evaporation is reduced to about 10%, the mass may be heated to develop its catalytic properties. An elevated temperature within the range of from about 1000 to about 1500° F. is usually best to develop the desired catalytic properties. The material at this point will be either a powder or a material readily powdered and may be used as such or after forming into pellets or granules by extrusion or pressing methods. The catalytic material thus produced is substantially free from undesirable contaminating substances and shows high catalytic activity.

The catalytic composites formed by Methods I, II and III may be contacted with solutions of compounds of calcium, strontium, or barium to incorporate small proportions of these materials which can be subsequently converted to the oxides to produce multi-component catalysts.

The conditions of operation which may be employed when these catalysts are used in dehydrogenation operations depend to a large extent upon the type of catalyst that is used, the material being dehydrogenated, the extent of dehydrogenation that is desired, and upon various other factors. Generally speaking, in the case of reforming gasoline fractions or naphthas in the presence of hydrogen, i. e., in so-called "hydroforming," temperatures in the range of from about 450-750° C.; pressures in the range of from atmospheric to 40 atmospheres or more; liquid hourly space velocities usually below about 10 and preferably in the range of from .1 to 5; and molal ratios of hydrogen to charging material in the range of .2 to 8 are usually employed. In general, relatively high space velocities are used at relatively high temperatures within the ranges indicated, and at any given temperature a relatively high space velocity may be used with a relatively high pressure. In this process, any hydrogen-containing gas (oxygen free), preferably one predominantly hydrogen, may be employed. Since a net production of hydrogen results from the "hydroforming" process, a part of the process gases may be recycled.

By the term "liquid hourly space velocity" as herein used we mean the volumes of hydrocarbon measured as liquid at normal temperature, per bulk volume of granular catalyst per hour.

The term "gas hourly space velocity" as used herein refers to the volumes of hydrocarbon measured as a gas at standard conditions of temperature and pressure, per bulk volume of granular catalyst per hour.

If the reaction is carried out in the presence of powdered catalyst moving through a reaction zone, the ratio of catalyst to hydrocarbon may be expressed in appropriate terms corresponding to the conditions expressed by these definitions.

In the case of catalytic reforming wherein hydrogen is not used the operating conditions may otherwise be substantially the same as in the "hydroforming" process.

In aromatizing a hydrocarbon consisting of or containing aliphatic hydrocarbons having 6 or more carbon atoms per molecule, the operating conditions may be as follows: temperatures in the approximate range of from 450-700° C.; pressures varying from atmospheric to 10 atmospheres or more, and liquid space velocities usually less than about 10 and preferably ranging from about 0.1 to 5. In this type of operation it may in some case be desirable to supply or recirculate hydrogen or hydrogen-containing gas to the reaction zone.

In the dehydrogenation of naphthenes containing 6 carbon atoms in a ring, temperatures ranging from 250° C. to 650° C., liquid space velocities in the range of from about 0.1 to about 20, and pressures ranging from atmospheric to 10 atmospheres or higher may be used. Usually, the charging materials for aromatization processes are stock which consist not only of straight chain aliphatic hydrocarbons but also of naphthenes containing 6 carbon atoms in a ring. For this reason, when operating on a charge containing both aliphatic hydrocarbons and naphthenes, conditions for the aromatization of the aliphatic hydrocarbons are employed, if it is desired to form aromatics from the aliphatics as well as from the naphthenes.

In dehydrogenating aliphatic hydrocarbons into corresponding less saturated aliphatic hydrocarbons such as dehydrogenating paraffins to form olefins; mono-olefins to form diolefins; and the like, the conditions which are employed will depend to a large extent upon the charging material. For example, in the dehydrogenation of butane to form butenes, temperatures ranging approximately from 450 to 700° C.; gaseous space velocities ranging from 200 to 5000; and pressures ranging from subatmospheric to about 10 atmospheres are usually used.

In dehydrogenating butane or butene or butane-butene mixtures to butadiene, the temperatures may range from 450 to 700° C., the gas space velocities from 200 to 3000, and the pressure, atmospheric, but preferably substantially subatmospheric. The partial pressure of the $C_4$ hydrocarbons is usually kept below 300 mm. mercury absolute, preferably between 15 and 250 mm. mercury absolute, in order to prevent undue decomposition of the butadiene. The partial pressure of the hydrocarbon may be reduced by use of steam or other inert gases in some cases.

In the dehydrogenation of ethylbenzene to form styrene, the temperatures may range from 450-700° C., and the liquid space velocities from 0.1 to 5. Low pressures are preferred, ranging from 0.1 to 2 atmospheres. In this case the partial pressure of the ethylbenzene may be reduced by steam or other inert gas.

In general when dehydrogenating organic compounds according to the present invention, temperatures and pressures to be employed may be of the order of those heretofore employed in like reactions.

The following are specific examples of the preparation of catalysts and their use in specific embodiments of the present process.

EXAMPLE I

Hydroforming of low octane number gasolines according to the invention using an alumina-molybdena composite as catalyst prepared in accordance with our preferred method is considered in comparison with the use of catalysts prepared by the conventional procedure of impregnating prepared granules of alumina with compounds yielding molybdenum oxides.

In the preparation of the presently preferred type of catalyst aluminum chloride hexahydrate is dissolved in water, one liter of water being used per gram mole of the compound $AlCl_3.6H_2O$. To such a solution an amount of ammonium molybdate is added so that in the finally prepared catalyst there is a weight percentage of molybdenum oxides calculated as $MoO_3$ equal to about 7 per cent of the total composite. During thorough agitation of the solution varying amounts of ammonium hydroxide may be added to produce different pH values corresponding to the precipitation of substantially all of the dissolved aluminum salt as hydrated aluminum oxide. The suspension of hydrated aluminum oxide in the ammonium molybdate solution is then heated to drive off water and produce a residual solid mass which in each case is then heated to a temperature of about 370° C. to about 400° C., ground to pass a 30 mesh sieve, mixed with 4 per cent by weight of rosin and formed into ⅛" by ⅛" pellets. To free the pellets of rosin and a major portion of the combined water, they are heated in the presence of air at about 600° C. for about two hours and then at above 750° C. for approximately 6 hours.

The catalyst thus prepared is compared with another catalyst manufactured in substantially identical manner except that no ammonium hydroxide is added during the preparation. The catalyst is further compared with one made by impregnating ⅛" by ⅛" pellets of an activated alumina of commerce with ammonium molybdate solution followed by drying and calcining under substantially the conditions used above. The concentration of molybdenum oxides in the calcined composite correspond to that of the other two catalysts. The catalyst is typical of those used in commercial hydroforming operations except that it is calcined at a higher temperature than is ordinarily used.

Experience has shown that the behavior of catalysts calcined at 750° C. for 6 hours and then tested for activity under the conditions shown is a qualitative evaluation of the ability of the catalysts to stand up under long periods of operation. No absolute correlation between the test and the life of the catalyst has been worked out, but experience has shown that the catalyst having the higher activity after such calcination is superior for commercial purposes.

Catalysts prepared in the manner described are tested for hydroforming activity in the treatment of a Mid-Continent naphtha fraction boiling from 103–207° C. and having an A. S. T. M. octane number of 35. The prepared catalyst pellets are placed in tubular reactors, and the vapors of the naphtha mixed with about 4.5 moles of hydrogen per average mole of naphtha are passed through the catalyst at a temperature of about 505° C. at a pressure of 7 atmospheres, and a liquid hourly space velocity of 0.5.

The results are shown in Table I.

TABLE I

Comparative data on alumina-molybdena catalysts in hydroforming

| | Run No. | | | | | |
|---|---|---|---|---|---|---|
| | 1 | 2 | 3 | 4 | 5 | 6 |
| Precipitant | None | NH$_4$OH | NH$_4$OH | (NH$_4$)$_2$CO$_3$ | (NH$_4$)$_2$CO$_3$ | Impregnated Catalyst |
| Final pH Value | 1.8 | 4.9 | 8.5 | 5.0 | 7.8 | |
| Calcining Temp., ° C | 750 | 750 | 750 | 750 | 750 | 750 |
| Yield of Gasoline, Volume Per cent | 82.0 | 71.4 | 63.6 | 69.6 | 68.0 | 90.0 |
| Octane No. of 10 Pound R. V. P.[1] Gasoline | 76.9 | 84.5 | 88.3 | 87.0 | 86.6 | 59.0 |
| Carbon, Wt. Per cent | 0.30 | 0.88 | 0.94 | 1.33 | 0.71 | 0.14 |

[1] Reid vapor pressure.

The catalysts made by the present process are more active than catalysts of the same chemical composition made by evaporating solutions of salt of the components and calcining the residue, or by the conventional impregnation process. This fact is evidenced by the higher octane numbers of the reformed gasoline.

The data establish the superiority of the process of this invention.

To further establish the superiority of our preferred operation, our catalyst is compared with the impregnated catalyst calcined at 600° C. for 6 hours. Under these conditions the maximum activity of the impregnated catalyst is developed. The results are shown in Table II.

TABLE II

| | Run No. | |
|---|---|---|
| | 8 | 9 |
| | Catalyst | |
| | Improved Al$_2$O$_3$-MoO$_3$ | Impregnated Al$_2$O$_3$-MoO$_3$ |
| Calcination Temp., ° C | 750 | 600 |
| Processing Temp., ° C | 500 | 500 |
| Liquid Hourly Space Velocity | 1 | 0.5 |
| Yield Gasoline, Volume Per Cent | 80.5 | 79.1 |
| Carbon, Wt. Per Cent | 0.44 | 0.76 |
| A. S. T. M. Octane No | 80.5 | 78.7 |

By our process it becomes possible to employ double the space velocity (half the contact time) and produce a higher yield of higher octane number gasoline. Moreover, less carbon is formed than is the case with the impregnated catalyst.

From these data it would appear that by operating according to the invention instead of with the conventional impregnated catalyst, a plant of given catalyst capacity would be doubled in reforming capacity while producing a better quality product. Actually this is not the only benefit realized. Because of lower carbon formation, the requirements for regeneration facilities in connection with the reforming plant are materially reduced; less of the charging stock is lost through carbon formation; less time is required for regeneration and conversely, more time is available for processing; fewer and less severe regenerations are required which is a factor favoring economy and longer catalyst life. In addition to the fact that the catalyst activity is maintained over longer periods of use, higher octane numbers may be obtained with our catalyst than is the case with catalysts produced by the impregnation method.

EXAMPLE II

The following illustrates hydroforming with catalysts consisting of associations of alumina and vanadia in our process as compared to the use of catalysts of similar chemical composition but made by impregnating activated alumina. The alumina-vanadia catalyst is made by preparing an ammoniacal solution of ammonium vanadate and adding it to a solution of aluminum chloride. The amount of ammonia added is such that a major proportion of the aluminum precipitates as hydrated aluminum oxide while the vanadium compound remains in soluble form. After evaporating the solvent, the residual material is heated at 600° C. to produce a composite containing 5 per cent by weight of vanadium oxides calculated at V$_2$O$_5$.

Impregnated catalyst for comparison is made by adding aqueous ammonium vanadate solution to commercial activated alumina similar to that used in Example I, and calcining at 600° C.

The hydroforming of a Mid-Continent naphtha with these catalysts is carried out at 525° C.; liquid space velocity 0.75; 6 mol hydrogen (based on the hydrogen content of recycled process gas) per mol of gasoline; and pressure of 20 atmospheres. Our process yields about 75 per cent of 85 octane number gasoline. The use of the impregnated catalyst yields 76 per cent of 80 octane number gasoline. The weight percentages of carbon on the catalysts are 0.9 per cent and 1.0 per cent respectively.

EXAMPLE III

Dehydrogenation of butane and butylene to butadiene is carried out by our process. In order to operate at a reasonably low effective temperature and at a pressure not lower than is necessary and consistent with good conversion a catalyst of high activity and low carbon forming tendency is used. Catalysts suitable for this purpose include alumina associated with molybdena, chromia, vanadia, and ceria. These may be associated with oxides of zinc, calcium, strontium, barium and magnesium. The relative proportions of alumina and the added oxide or oxides depend to a large extent upon which catalytic substance is employed. Ordinarily the alumina comprises the major constituent. Smaller amounts of molybdena are preferred than is the case with chromia. The amount of chromia is usually from about 2 to about 40 per cent, while as a rule the best results are obtained with less than 10 per cent molybdena in the composite catalyst.

In Table III are shown comparative results employing impregnated catalysts and those preferred in the process of our invention.

The impregnated catalysts are made according to the general procedure of soaking activated alumina in a solution of a compound of the added substance, drying and calcining. Thus, the catalyst in run #10 is prepared from activated alumina, chromic acid, and magnesium chromate. The alumina-molybdena catalyst of run #11 is prepared by soaking altivated alumina with ammonium molybdate solution. The magnesia is added to the chromia-alumina catalyst because it tends to stabilize the catalyst against loss of activity at high temperatures, although this catalyst is of about the same activity initially whether magnesia is present or not.

The improved alumina-molybdena catalyst used in accordance with the invention in run #13 is prepared as outlined in Example I. The improved alumina-chromia catalyst employed according to the invention in run #12 is prepared by forming a solution of alumina chloride and chromium nitrate. Thereafter sufficient quantity of ammonium hydroxide is added to precipitate a major proportion of the alumina without, however, rendering the chromium compound unsoluble. The mixture is then evaporated to substantial dryness and calcined at a temperature of about 700° C. for 6 hours. The results of dehydrogenating a butane-butene mixture containing approximately 40 per cent butene to produce butadiene is shown together with the operating conditions in Table III.

TABLE III

*Dehydrogenation of butane-butene mixture to butadiene*

| | Run No. | | | |
|---|---|---|---|---|
| | 10 | 11 | 12 | 13 |
| | Catalyst | | | |
| | Impregnated | | Improved | |
| | 86% Al$_2$O$_3$ 12% Cr$_2$O$_3$ 2% MgO | 92% Al$_2$O$_3$ 8% MoO$_3$ | 88% Al$_2$O$_3$ 12% Cr$_2$O$_3$ | 92% Al$_2$O$_3$ 8% MoO$_3$ |
| Calcining Temp., ° C | 700 | 700 | 700 | 700 |
| Process Temp., ° C | 675 | 675 | 675 | 675 |
| Process pressure mm. Hg | 80 | 80 | 80 | 80 |
| Gas Hourly Space Velocity | 1,300 | 1,300 | 1,300 | 1,300 |
| Process Period, Minutes | 30 | 30 | 30 | 30 |
| Yield of Butadiene, Wt. percent: | | | | |
| Once Through | 23 | 24 | 25.5 | 27 |
| Ultimate Yield Based on Recycle | 76 | 68 | 84 | 86 |
| Carbon, Wt. percent | 2.34 | 1.96 | 1.4 | 1.32 |

The data show that there is a substantial improvement in the amount of butadiene produced both on a once-through and on a recycle basis when using the improved catalysts. Furthermore, less carbon is formed in the case of the improved catalysts than in the case of the impregnated catalysts. The advantages of such an operation are apparent both from the standpoint of conversion and plant costs.

Furthermore, the improved catalysts retain their activity for a much longer time than in the case of the impregnated catalysts. At a point at which the impregnated catalysts drop in activity so that a once-through yield of about 12 per cent of butadiene is obtained the operation with the improved catalysts produces more than 20 per cent per pass.

EXAMPLE IV

Paraffin hydrocarbons containing at least 6 carbon atoms may be converted in accordance with the invention into aromatics by treatment with the catalysts of the character described. For this purpose the catalysts comprising alumina in association with difficultly reducible oxides having more than one valence state are suitable. Oxides of elements selected from the left-hand columns of groups IV, V and VI are especially useful. Of the preferred individual components associated with alumina, the oxides of molybdenum, chromium, vanadium, tungsten, and cerium are examples.

Table IV illustrates comparative results when a n-heptane fraction obtained by distillation of mineral oil is cyclicized with the improved catalysts of our process and catalysts produced by impregnation of activated alumina under average operating conditions as shown in the table.

Table IV
Cyclization of heptane

| | Run No. | | | |
|---|---|---|---|---|
| | 14 | 15 | 16 | 17 |
| | Catalyst | | | |
| | Impregnated | | Improved | |
| | 86% Al$_2$O$_3$—12% Cr$_2$O$_3$—2% MgO | 97% Al$_2$O$_3$—3% MoO$_3$ | 88% Al$_2$O$_3$—12% Cr$_2$O$_3$ | 97% Al$_2$O$_3$—3% MoO$_3$ |
| Calcining Temp., °C | 600 | 600 | 700 | 700 |
| Processing Conditions: | | | | |
| Temp., °C | 550 | 550 | 550 | 550 |
| Pressure, Atm | 1 | 1 | 1 | 1 |
| Liquid Hourly Space Velocity | 0.5 | 0.5 | 0.5 | 0.5 |
| Process Period, Hrs | 4 | 4 | 4 | 4 |
| Yields, Wt. Per Cent Charge: | | | | |
| Liquid Recovery | 73 | 78 | 74 | 72 |
| Aromatics [1] | 43 | 25 | 65 | 62 |
| Carbon | 2.2 | 3.05 | 1.3 | 1.5 |

[1] Largely toluene.

The results in the table show that the operation according to the invention is substantially superior both as to yields of aromatic hydrocarbons and to total liquid recovery. Furthermore, although the yield of aromatic hydrocarbons is substantially better when using the improved catalysts than with the use of the impregnated catalysts the actual amount of carbon formed is substantially less. Because of the relatively high temperature used in the cyclization it is desirable to use a catalyst having a good stability over extended periods of processing and regeneration, an advantage realized in the case of our improved catalyst.

EXAMPLE V

The catalyst for this example was prepared in the following manner: Ammonium hydroxide was added to a solution of 1 gram molecular equivalent of aluminum chloride hexahydrate in a liter of water. Concentrated ammonium hydroxide was used and the addition was made over a period of about one hour until the pH was 6.7. At this point the precipitate was filtered in a pressure filter and the wet hydrogel reslurried in about 1 liter of water and the operation of filtering and reslurrying was repeated twelve times. The wash water used was maintained at a pH value close to 7. The gel was not permitted to dry other than by expressing the water held therein. It contained about 85% of water.

The washed wet hydrated alumina was then slurried in a liter of water and a 20% solution of ammonium molybdate and thoroughly mixed with the slurry. The water was then evaporated and the residual material was heated at a temperature of about 250° F. to remove most of the water, and then ground to pass a 30 mesh sieve, mixed with 4% rosin, formed into 1/8" x 1/8" cylindrical pellets in a standard type pelleting machine and heated to a temperature of about 1500° F. for six hours. Its composition was then—alumina 93%, molybdenum oxide 7%.

A catalyst was prepared for comparative purposes, from the commercial activated alumina, a powdered material was used which contained 35% total water by weight of which about 10% was free of uncombined water. Otherwise the procedure was substantially the same, and the alumina-molybdena ratio was the same as for the catalyst above described.

The two catalysts thus produced were tested as to their activity in hydroforming a Mid-Continent naphtha having the following properties:

| | |
|---|---|
| A. P. I. gravity, 60° F | 52.8 |
| Initial boiling point, °F | 217 |
| End-point, °F | 404 |
| Octane number | 34.5 |
| Molecular weight | 132 |
| Bromine number | 0.5 |

In the runs the naphtha was vaporized, mixed with 3.5 mols of hydrogen per mol of naphtha and passed over a stationary bed of catalyst particles at a temperature of 940° F., under a pressure of 100 pounds per square inch. The liquid hourly space velocity based on the naphtha charge referred to the catalyst space was 1 and the processing period was 6 hours.

Comparative catalytic activity test data

| | Catalyst Number | |
|---|---|---|
| | 1 | 2 |
| Volume per cent liquid | 73.8 | 90.7 |
| Weight per cent liquid recovery | 77.35 | 92.4 |
| Weight per cent carbon | 0.31 | 0.22 |
| Octane Number of 400° F. E. P. Fraction | 82.1 | 68 |

In the above tabulation column 1 contains the figures obtained using the catalyst prepared in accordance with the present process, while column 2 contains the corresponding figures obtained using the catalyst in the preparation of which the commercial activated alumina was used. The data indicate that the catalyst prepared in accordance with the present process has considerably higher activity as measured by the higher octane number of the liquid product.

We claim as our invention:

1. A process for the manufacture of a catalyst comprising alumina and another catalytically active oxide of a metal, which comprises forming a solution of an aluminum salt having the aluminum in its cation and a compound of said metal containing the metal in the anion and whose cation is volatilizable, adding to said solution a volatile basic precipitant in sufficient amount to bring the pH to a value of at least 4, thereby precipitating hydrate alumina and forming from the acid radical of the aluminum salt and said precipitant a salt which is readily volatilizable, subjecting the total reaction mass thus formed to evaporation to reduce the mass to substantial dryness, and heating the residual material sufficiently to convert said metal compound to the oxide.

2. The process as defined in claim 1 further characterized in that said metal is an element in the left-hand column of group VI of the periodic table.

3. The process as defined in claim 1 further characterized in that said metal is an element in the left-hand column of group V of the periodic table.

4. The process as defined in claim 1 further characterized in that said metal in molybdenum.

5. The process as defined in claim 1 further characterized in that said metal is chromium.

6. A process of catalyst manufacture which comprises forming a solution of aluminum chloride and ammonium molybdate, adding to said solution a sufficient quantity of ammonium hydroxide to obtain a pH value of at least 4, thereby precipitating hydrated alumina, evaporating the resultant total suspension of alumina in ammonium molybdate solution to a substantially solid residue, and heating the residue sufficiently to decompose the ammonium molybdate to molybdenum oxide.

GLENN M. WEBB.
MARVIN A. SMITH.

REFERENCES CITED

The following references are of record in the file of this patent:

UNITED STATES PATENTS

| Number | Name | Date |
| --- | --- | --- |
| 1,782,857 | Miller et al. | Nov. 25, 1930 |
| 2,184,235 | Groll et al. | Dec. 19, 1939 |
| 2,229,353 | Thomas et al. | Jan. 21, 1941 |
| 2,249,337 | Visser et al. | July 15, 1941 |
| 2,274,633 | Pitzer et al. | Mar. 3, 1942 |
| 2,322,863 | Marschner et al. | June 29, 1943 |
| 2,331,338 | Michael et al. | Oct. 12, 1943 |
| 2,342,247 | Burk | Feb. 22, 1944 |
| 2,342,248 | Burk | Feb. 22, 1944 |
| 2,382,394 | Bremmer et al. | Aug. 14, 1945 |
| 2,395,836 | Bates | Mar. 5, 1946 |

FOREIGN PATENTS

| Number | Country | Date |
| --- | --- | --- |
| 504,614 | Great Britain | Apr. 24, 1939 |